(12) United States Patent
Mayer et al.

(10) Patent No.: US 7,199,354 B2
(45) Date of Patent: Apr. 3, 2007

(54) DETECTOR ARRAY FOR OPTICAL ENCODERS

(75) Inventors: Elmar Mayer, Nussdorf (DE); Ruth E. Franklin, Santa Barbara, CA (US)

(73) Assignees: Dr. Johannes Heidenhain GmbH, Traunreut (DE); Renco Encoders, Inc., Goleta ( * ) Notice: Subject to any disclaimer, the term of this patent is extended or adjusted under 35 U.S.C. 154(b) by 180 days.

(21) Appl. No.: 10/927,990

(22) Filed: Aug. 26, 2004

(65) Prior Publication Data

US 2006/0043272 A1    Mar. 2, 2006

(51) Int. Cl.
*G01D 5/34* (2006.01)
*H03M 1/22* (2006.01)

(52) U.S. Cl. .................... 250/231.13; 341/13
(58) Field of Classification Search ......... 250/231.13, 250/231.14–231.18; 341/4–6, 11, 9, 13, 341/15
See application file for complete search history.

(56) References Cited

U.S. PATENT DOCUMENTS

| 4,259,570 | A | * | 3/1981 | Leonard | 250/214 A |
| 4,786,891 | A | * | 11/1988 | Ueda et al. | 341/13 |
| 5,128,536 | A | * | 7/1992 | Higashi | 250/231.16 |
| 5,129,725 | A | * | 7/1992 | Ishizuka et al. | 356/617 |
| 5,438,330 | A | * | 8/1995 | Yamazaki et al. | 341/11 |
| 5,698,851 | A | * | 12/1997 | Peschansky et al. | 250/231.16 |
| 6,577,984 | B1 | * | 6/2003 | Clairet et al. | 702/151 |
| 6,727,493 | B2 | | 4/2004 | Franklin et al. | |
| 2003/0155492 | A1 | * | 8/2003 | Atsuta et al. | 250/231.13 |

FOREIGN PATENT DOCUMENTS

EP    0 710 819    5/2003

* cited by examiner

*Primary Examiner*—Georgia Epps
*Assistant Examiner*—Kevin Wyatt
(74) *Attorney, Agent, or Firm*—Kenyon & Kenyon LLP

(57) ABSTRACT

A photodiode detector array for optical encoders includes a plurality of photodiodes, each of the photodiodes providing a scanning signal with a defined phase relationship to a scale when the detector array moves relative to the scale. A plurality of switching elements is provided for selectively combining each of the photodiodes with other photo diodes in a defined manner. The switching elements allow the photodiodes to be unambiguously combined for at least two different scale radii so that a defined number of phase shifted scanning signals is generated in each case. The combination of the photodiodes differs between the at least two different scale radii.

15 Claims, 8 Drawing Sheets

DETECTOR ARRAY FOR OPTICAL ENCODERS

FIELD OF THE INVENTION

The present invention relates to a detector array for optical encoders. In particular, the present invention regards switchable detector arrays for different rotary scale radii.

BACKGROUND INFORMATION

Certain optical encoders for determining the relative position between two movable objects are conventional. It is possible to determine relative positions in linear movement directions as well as in rotary movement directions. In these systems, one object is usually connected with a measuring graduation while the other object is connected with a scanning unit. In the case of a linear encoder, a linear scale with a linear measuring graduation is used, whereas in the case of a rotary encoder, a code disk with a circular measuring graduation is used. The scanning unit used for either linear movement or rotary movement has one or more illumination sources and one or more optoelectronic detector elements. As detector elements, photodiodes are usually used.

In the last several years, linear and rotary encoders have become more and more popular having a plurality of interdigitized photodiodes as detector elements. Such a detector arrangement is also referred to a phased array or a structured photodetector. Following, the term detector array will be used.

It is conventional that these detector arrangements may have photodiodes arranged in an array on a semiconductor chip. The arrangement of the photodiodes has to be tailored for each encoder configuration in a unique manner. This means that the required geometrical arrangement of the photodiodes, such as their length, width and spacing, depends on the chosen scanning configuration, especially on the graduation period or graduation pitch of the scanned measuring graduation. For a certain measurement resolution—which is defined by the given graduation pitch of the measuring graduation—there exists a well-defined arrangement of photodiodes. Accordingly, if there is a need to change the resolution of the encoder by changing to a different scanned graduation pitch, there will be also a need to modify the design of the photodiode array in order to achieve the desired scanning configuration or resolution. An enormous amount of design work may be necessary to modify the layout of the photodiode array in this case.

To solve the above-mentioned problem, European Published Patent Application No. 0 710 819 describes the use of a detector array with a plurality of photodiodes for several different measuring graduations having different graduation periods. For that purpose, only a certain number of all available photodiodes has to be activated in dependence of the scanning graduation. An adaptation procedure is necessary to determine in each case which of the photodiodes have to be activated for a certain scanning graduation. One drawback of this system is that it may require a complex ASIC to control the adaption procedure. Another disadvantage is that the system's activation phase may require special tooling discs should light be allowed to shine on multiple incremental data signal groups. Furthermore, a lot of space for memories and associated circuitry on the carrier substrate may be necessary which is contrary to a possible miniaturization of the system.

Therefore, U.S. Pat. No. 6,727,493, which is expressly incorporated herein in its entirety by reference thereto, describes a detector array with an easily changeable resolution. For that purpose, a resolution selection unit is connected to the photodiode array and is used to control the resolution of the array, wherein all photodiodes associated with the photodiode array are active irrespective of the actual resolution selected by the resolution selection unit. In the case of a rotary device, this arrangement allows switching between different resolutions or different code disc pitches at a defined rotary scale radius.

U.S. Pat. No. 6,727,493 does not offer a solution, however, if an encoder with a rotary scale on the code disc having a second radius is necessary for another application in which the first and second radii are different. In this case, a different photodiode array has to be designed for each rotary scale radius again. This requires a further amount of design work necessary to modify the layout of the photodiode array so that it can be used to scan a rotary scale on a code disc with at least a second rotary scale radius.

Similar problems arise if index marks optimized for a certain scale radius have to be scanned by a suitable photodiode detector array. Index marks on the code disc are usually used to generate so-called reference signals indicating a certain defined absolute position along the measuring graduation. In this case it also requires new design work if a photodiode detector array has to be optimized for different code disc radii.

SUMMARY

An example embodiment of the present invention may provide a photodiode detector array for optical encoders which may be used in connection with at least two different scale radii.

An example embodiment of the present invention may provide a rotary encoder with a detector array for scanning rotary scales on a code disc in which the photodiode detector array may be used in connection with at least two different rotary scale radii.

An example embodiment of the present invention may provide a photodiode detector array for rotary encoders which may be used to scan index marks on code discs having different rotary scale radii.

According to an example embodiment of the present invention, an optical encoder provides position information of a scale which is movable with respect to the detector array and the detector array is usable in connection with at least two different scale radii. The detector array includes a plurality of photodiodes, each of the photodiodes providing a scanning signal with a defined phase relationship to the scale when the detector array moves relative to the scale. A plurality of switching elements is provided for selectively combining each of the photodiodes with other photo diodes in a defined manner. The switching elements are arranged so that the photodiodes are unambiguously combined for at least two different scale radii so that a defined number of phase shifted scanning signals are generated, and the combination of the photodiodes differs between the at least two different scale radii.

According to an example embodiment of the present invention, a rotating code disc includes a circumferentially arranged rotary scale with a defined scale pitch. Furthermore, a detector array is provided with a plurality of photodiodes, each of the photodiodes providing a scanning signal with a defined phase relationship to the scale when the detector array moves relative to the rotary scale. A plurality of switching elements is provided for selectively combining each of the photodiodes with other photo diodes in a defined manner. The switching elements are arranged so that the photodiodes are unambiguously combined for at least two different rotary scale radii so that a defined number of phase shifted scanning signals are generated, and the combination of photodiodes differs between the at least two different scale radii.

According to an example embodiment of the present invention, a photodiode detector array for rotary encoders may be suitable to scan index marks on code discs having different rotary scale radii. The detector array includes a plurality of photodiodes, each of the photodiodes providing a reference signal when the detector array moves relative to an index mark in the rotary scale. A plurality of switching elements is provided for selectively combining each of the photodiodes with other photo diodes in a defined manner. The switching elements are arranged so that the photodiodes are unambiguously combined for at least two different rotary scale radii so that defined reference signals are generated, and the combination of the photodiodes differs between the at least two different rotary scale radii.

An example embodiment of the present invention may provide for ease of modification of the radius of a scale in an optical encoder without having the need to design a different photodiode detector array. A conventional photodiode detector array may be used in connection with scales having different radii.

According to an example embodiment of the present invention, a detector array for optical encoders for providing position information of a scale movable with respect to the detector array, in which the detector array is adapted to be used in connection with at least two scales having different radii, includes: a plurality of photodiodes, each photodiode configured to provide a scanning signal with a defined phase relationship to the scale when the detector array moves relative to the scale; and a plurality of switching elements configured to selectively combine each photodiode with other photodiodes in a defined manner. The switching elements are configured to allow the photodiodes to be unambiguously combined for at least two different scale radii to generate a defined number of phase shifted scanning signals, and a combination of the photodiodes differing between the at least two different scale radii.

The plurality of photodiodes may be arranged in at least two photodiode tracks, each track may include a partial photodiode array with photodiodes extending in radial direction, and the different photodiode tracks may be arranged concentrically with respect to each other.

Photodiodes in different tracks may arranged to generate incremental scanning signals with identical phase relationships, and the switching elements may be configured to connect the photodiodes in different tracks.

A plurality of adjacent photodiodes in each track may be arranged to generate incremental scanning signals with identical phase relationships, and the switching elements may be configured to connect the plurality of adjacent photodiodes.

The at least two photodiode tracks may include two tracks including partial photodiode arrays, and each track may include four groups of photodiodes configured to generate four incremental scanning signals with phase relationships 0°, 90°, 180° and 270°.

Each group of photodiodes may include an identical number of photodiodes.

The partial photodiode arrays in the tracks may include physically separated photodiodes in the tracks, and the tracks may be shifted with respect to each other by a predefined circumferential shift amount.

The partial photodiode arrays in the tracks may include physically separated photodiodes in the tracks, and different phase relationships may be assigned to photodiodes extending along a common radial direction by corresponding switching configurations.

The different scale radii may include a first finite radius and a second finite radius, and the first finite radius may be different from the second finite radius.

The different scale radii may include a first finite radius and a second infinite radius.

The detector array may be displaced in a radial direction with respect to the scale by a radial displacement amount to establish a desired phase relationship of all photodiode output signals over a complete array length in a measuring direction.

According to an example embodiment of the present invention, a rotary encoder includes: a rotatable code disc including a circumferentially arranged rotary scale; and a photodiode detector array. The photodiode detector array includes: a plurality of photodiodes, each photodiode configured to provide a scanning signal with a defined phase relationship to the scale when the detector array moves relative to the rotary scale; and a plurality of switching elements configured to selectively combine each of the photodiodes with other photodiodes in a defined manner. The switching elements are configured to allow the photodiodes to be unambiguously combined for at least two different rotary scale radii to generate a defined number of phase shifted scanning signals, and a combination of the photodiodes differ between the at least two different rotary scale radii.

The plurality of photodiodes may be arranged in at least two different photodiode tracks, each track may include a partial photodiode array with photodiodes of rectangular shape extending in radial direction, and the different photodiode tracks may be arranged concentrically with respect to each other.

According to an example embodiment of the present invention, a detector array for optical rotary encoders for providing position information of a rotatable code disc with a circumferentially arranged rotary scale and at least one index mark, the detector array adapted to be used in connection with at least two rotary scales having different radii, includes: a plurality of photodiodes, each photodiode configured to provide a reference signal when the detector array moves relative to the rotary scale; and a plurality of switching elements configured to selectively combine each of the photodiodes with other photodiodes in a defined manner. The switching elements are configured to allow the photodiodes to be unambiguously combined for at least two different rotary scale radii to generate at least one defined reference signal, and the combination of photodiodes differ between the at least two different scale radii.

Each track may include two groups of photodiodes configured to generate two index scanning signals phase shifted by 180° with respect to each other.

In addition, the features described herein may also be used in connection with the detection of index signals which are generated by scanning index marks on code discs having different radii. Similar features with regard to reduced design expenses for the detector arrays as already discussed above may also result in this case.

These and other features and aspects of example embodiments of the present invention are described below and illustrated in the appended Figures.

BRIEF DESCRIPTION OF THE DRAWINGS

FIG. 3c is an enlarged partial view of the detector array illustrated in FIG. 3b.

FIG. 4a is a detailed view of the detector array illustrated in FIG. 3a.

DETAILED DESCRIPTION

Figure 1:
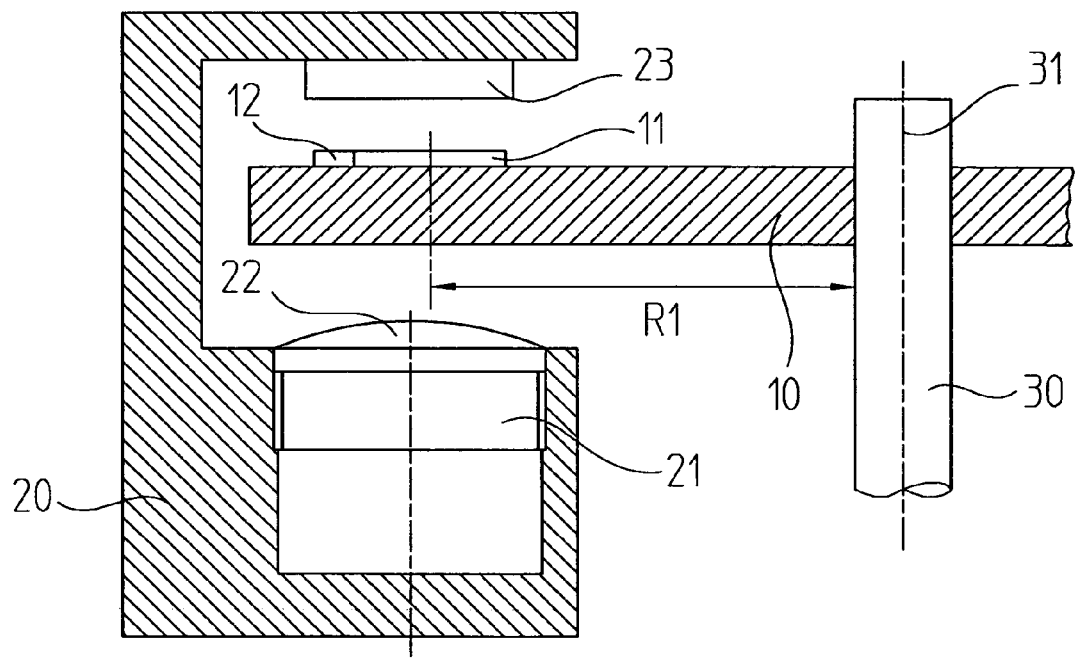
FIG. 1 schematically illustrates an optical rotary encoder in a side view.

FIG. 1 illustrates schematically a cross-section of an optical rotary encoder according to an example embodiment of the present invention. The rotary encoder is able to generate positional information with respect to the movement of two rotating objects. It may be used, for example, in applications together with machine tools and motors.

The optical encoder of this example embodiment includes a code disc 10 with an incremental rotary scale 11. The rotary scale 11 consists of a track with alternatively arranged opaque and transparent areas of rectangular shape along the measurement direction. Rotary scale 11 is arranged circumferentially and symmetrically around the axis of rotation on the code disc 10 and has a defined radius R1 as illustrated in FIG. 1. Code disc 10 is manufactured of glass or plastics, whereas the opaque areas of the rotary scale 11 are made of chrome deposited on the substrate material. The code disc 10 is mounted on a shaft 30 which may be connected with the rotor of a brushless motor for example.

Furthermore, the rotary encoder has a scanning unit 20 which includes a light source 21, a collimating lens 22 and a detector array 23. In the example embodiment illustrated in FIG. 1, the rotary scale 11 is arranged between the light source 21 and the collimating lens 22 on one side and the detector array 23 on the other side. The emitted light of the light source 21 is collimated by lens 22 and transmitted through the rotary scale 11 on the code disc 10. The detector array 23 arranged in the detection plane receives the transmitted light which is modulated by the rotary scale 11 if it rotates around axis 31. In an example embodiment, a fringe pattern which is cyclically modulated in dependence of the code disc rotation is generated in the detection plane. The modulated fringe pattern may be scanned in a conventional manner by the detector array 23 to generate scanning signals S0, S90, S180, S270. These position-dependent, intensity modulated signals S0, S90, S180, S270 are further processed in a downstream arranged control unit.

In addition to the track with the rotary scale 11, an index mark 12 is arranged in a further track on the code disc 10 at a defined position adjacent to the incremental rotary scale 11. The index mark 12 is used to generate a so-called reference signal at a well-defined absolute position along the measuring path so that the incremental measurement via scanning of the incremental rotary scale may be referenced with respect to a certain absolute position. It is also possible in alternative example embodiments that a plurality of index marks are arranged on the code disc, etc.

Whereas the rotary scale 11 of this transmitted light encoder example includes an incremental pattern of alternating transparent and non-transparent areas on the code disc 10 arranged along the measurement direction, the rotary scale may also be composed of alternating areas of high reflectivity and low reflectivity in an incident light encoder example embodiment.

The encoder structure is illustrated only schematically in FIG. 1 because details of its mechanical construction are believed to be understood to those of ordinary skill in the art.

The detector array 23 of scanning unit 20 of the rotary encoder illustrated in FIG. 1 may be used together with scales having different radii. It may not be necessary to design a completely new detector array hardware for scanning, e.g., different rotary scales. The identical detector array hardware may be used in different configuration states to scan at least two scales with different radii. An enormous reduction of otherwise necessary design work may result based on this flexibility.

Figure 2:
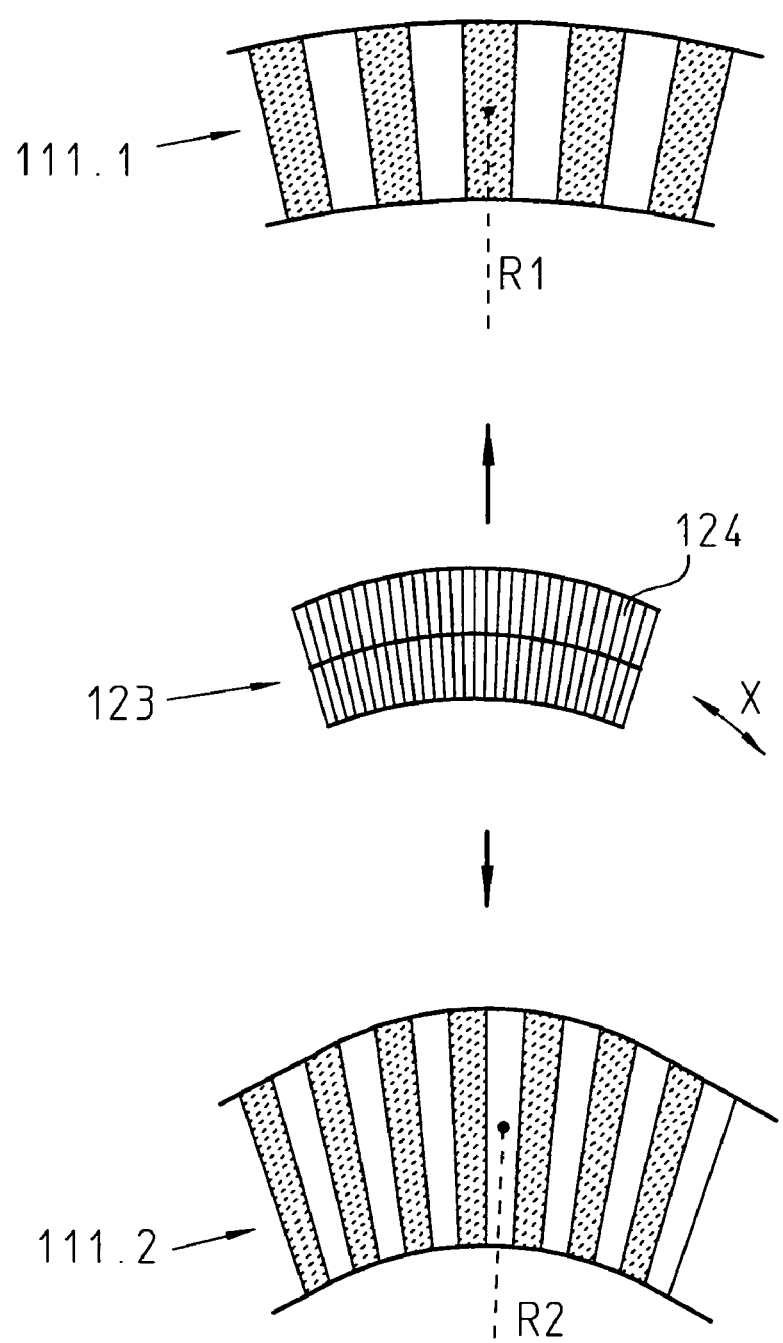
FIG. 2 schematically illustrates an example embodiment of a photodiode detector array together with partial views of two rotary scales having different radii.

This principle is illustrated schematically in FIG. 2, which illustrates an example embodiment of a photodiode detector array 123 together with partial views of two rotary scales 111.1, 111.2 having different radii R1, R2 (R1>R2). Rotary scales 111.1 and 111.2 are formed of a track with alternately arranged areas of different optical properties, e.g., transparent and opaque areas in the case of a transmitted light encoder example embodiment. Detector array 123 and rotary scales 111.1 or 111.2 are movable with respect to each other along measurement direction x. The identical photodiode detector array 123 may be used to scan a first incremental rotary scale 111.1 having a first radius R1 as well as to scan a second incremental rotary scale 111.2 having a second radius R2. Both radii R1, R2 differ as schematically indicated in FIG. 2.

As illustrated in FIG. 2, photodetector array 123 includes a plurality of rectangular shaped photodiodes 124 acting as photodectecting devices in the detection plane. The photodiodes 124 are arranged adjacent to each other along the measurement direction x on at least a partial circle segment. Measurement direction x corresponds to the direction of rotational movement of the rotary scales 111.1, 111.2. In an example embodiment, the photodetector array 123 includes 120 single photodiodes 124, the photodiodes 124 having a length I=400 μm and a width b=60 μm.

If the detector array 123 is moved relative to the rotary scales 111.1 or 111.2 in the rotary encoder of FIG. 1, each photodiode 124 of the photodetector array 123 provides a periodic scanning signal S0, S90, S180, S270 having a defined phase relationship with respect to the scanned rotary scale 111.1, 111.2. Those photodiodes 124 which generate scanning signals S0, S90, S180, S270 with the identical phase relationship are electrically connected with each other and form a group of photodiodes providing scanning signals of a defined phase. In an example embodiment, the scanning signals S0, S90, S180, S270 generated by the photodiodes 124 are sine-shaped. Each of the phase-different scanning signals S0, S90, S180, S270 is generated by a certain number of single photodiodes 124 which are suitably connected or switched together via switching elements. Four quadrature scanning signals S0, S90, S180, S270 may be generated which are phase shifted with respect to each other by a defined phase amount. Scanning signals S90, S180, S270 are phase shifted with respect to signal S0 by 90°, 180° and 270°. Quadrature scanning signals S0, S90, S180, S270 may be processed by a downstream arranged evaluation unit in a conventional manner so that two incremental output signals A, B are available, e.g., for control purposes, the output signals A, B being phase shifted with respect to each other by 90°.

Figure 3A:
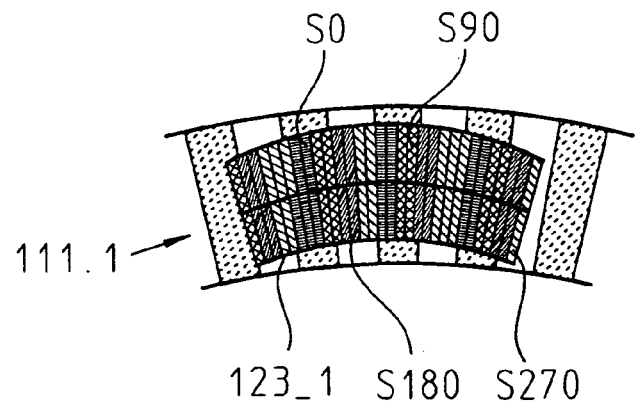
FIG. 3a schematically illustrates the application of the example embodiment of the photodiode detector array illustrated in FIG. 2 to the first rotary scale having a first radius.
Figure 3B:
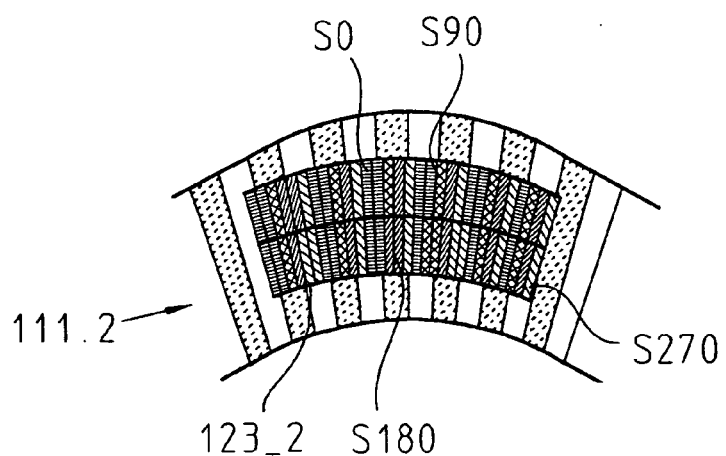
FIG. 3b schematically illustrates the application of the example embodiment of the photodiode detector array illustrated in FIG. 2 to the second rotary scale having a second radius.
Figure 3B:
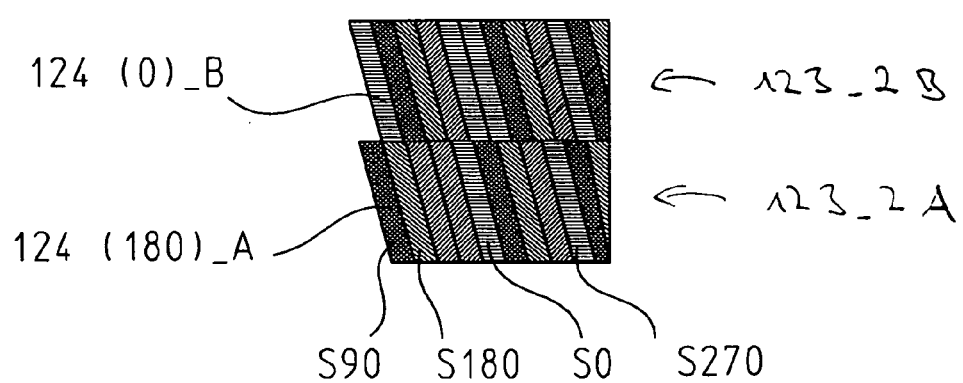

FIGS. 3a and 3b schematically illustrate the application of the detector array of FIG. 2 to the different rotary scales 111.1, 111.2 having radii R1 and R2. Due to the different switching states or configuration states the detector array is designated with different numerals 123_1, 123_2 in FIGS. 3a and 3b. In both FIGS. 3a and 3b, different hatchings of the photodiodes in the detector array 123_1, 123_2 indicate the different phase relationships of the photodiodes in the detector array. In both cases, four different kinds of hatchings are shown to illustrate that there are four phase-different scanning signals S0, S90, S180 and S270 generated by scanning the corresponding rotary scale 111.1 or 111.2.

As may be seen from the comparison of detector arrays 123_1 and 123_2 in FIGS. 3a and 3b, there are two different, unambiguous manners in which the photodiodes are connected and switched together in the detector array for both differing radii R1, R2. The manner in which the different switching states of the arrays 123_1 and 123_2 are realized via suitable switching elements is explained and schematically illustrated in FIGS. 4a to 4c.

As illustrated in FIGS. 2, 3a and 3b, the detector array used in this example includes two photodiode tracks being arranged adjacent and concentrically with respect to each other. Each of the photodiode tracks includes a partial photodiode array with photodiodes of rectangular (or more precisely trapezoidal) shape extending in radial direction. The partial photodiode arrays include physically separated photodiodes in both tracks which are suitably connected with each other. It is possible to arrange also more than two tracks in the detector array in this manner.

Provision of two or more concentrically arranged photodiode tracks may reduce the generation of incorrect signal phase relationships of the signals produced by the outer photodiodes in the detector array. By implementing such an arrangement, it is possible to assign each photodiode in each track the necessary (or correct) phase relationship with respect to the scanned scale structure so that potential phase errors of outer photodiodes in the array may be avoided. Otherwise, e.g., the outer photodiodes may not have the correct phase relationship to the scanned scale structure due to their length extension in radial direction.

With regard to the provision of two partial photodiode arrays in different tracks and their concrete geometric arrangement, there exist different example embodiments which may be realized.

It is possible to arrange the different partial photodiode tracks shifted with respect to each other by a defined displacement amount so that phase errors of certain photodiodes may be avoided. In this connection, it may be possible to shift the whole partial photodiode arrays with respect to each other as well as to shift selectively only some of the photodiodes of the partial photodiode arrays by the required displacement amount.

It also possible that there is no circumferential displacement amount between the photodiodes in each track but there are different phase relationships assigned to photodiodes extending along a common radial direction via suitable switching configurations. This may provide a more simple manufacturing process.

FIG. 3c is an enlarged view of the left outer area of the detector array configuration 111.2 which is suitable to operate at radius R2 and which is designed according to this principle. In FIG. 3c, photodiodes providing different signal phases are marked by different hatchings. In FIG. 3c, it is illustrated, e.g., the manner in which photodiode 124(180)_A in the inner partial photodiode array 123_2A is assigned the phase relationship 180° whereas the radially adjacent photodiode 124(0)_B in the outer partial photodiode array 123_2B is assigned the phase relationship 0°, etc.

In both configuration states, the photodiodes in the detector arrays which provide signals of identical phase relationship are electrically connected together.

As a basic requirement for the use of the same detector array together with at least two different rotary scale radii R1, R2, it may be necessary that the detector array includes a plurality of switching elements. The switching elements are used to combine the single photodiodes for each scanned scale radius in a well defined manner so that it may be ensured that output signals S0, S90, S180, S270 having the desired phase relationships are generated in at least two cases. The manner in which the photodiodes may be combined in both cases differs.

No dynamic adaption process may be required to adapt the photodiode array to a certain scale structure based on the light distribution generated by a certain code structure. In contrast herewith, the configuration state of the array which is suitable to scan a scale with a defined geometry, respectively radius, is determined as described below and then this configuration state is fixed for the chosen radius. No further adaption procedure may be required.

Figure 4A:
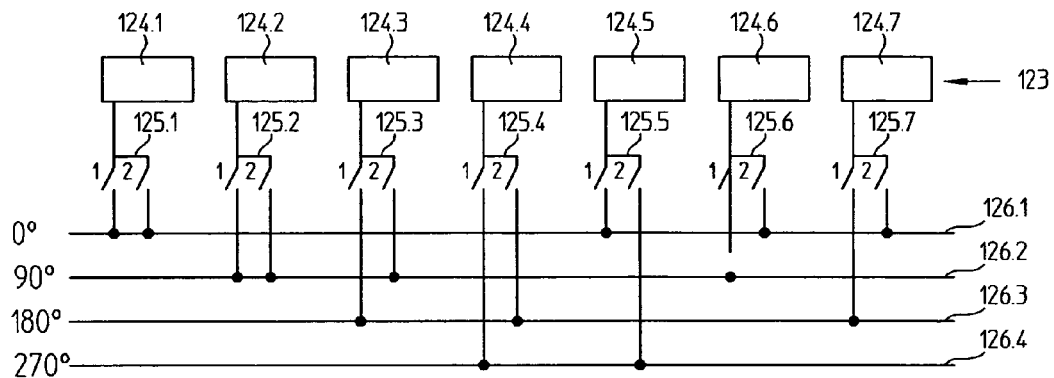
Figure 4B:
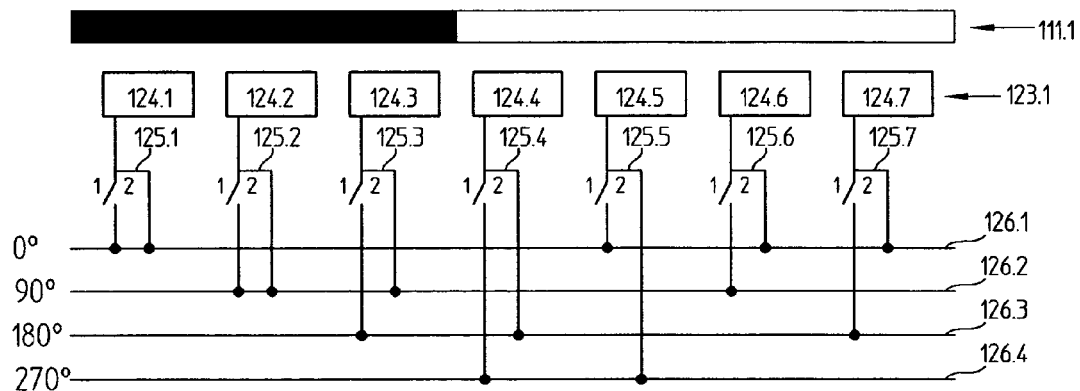
FIG. 4b illustrates the detector array illustrated in FIG. 4a adapted to first rotary scale having a first radius.
Figure 4C:
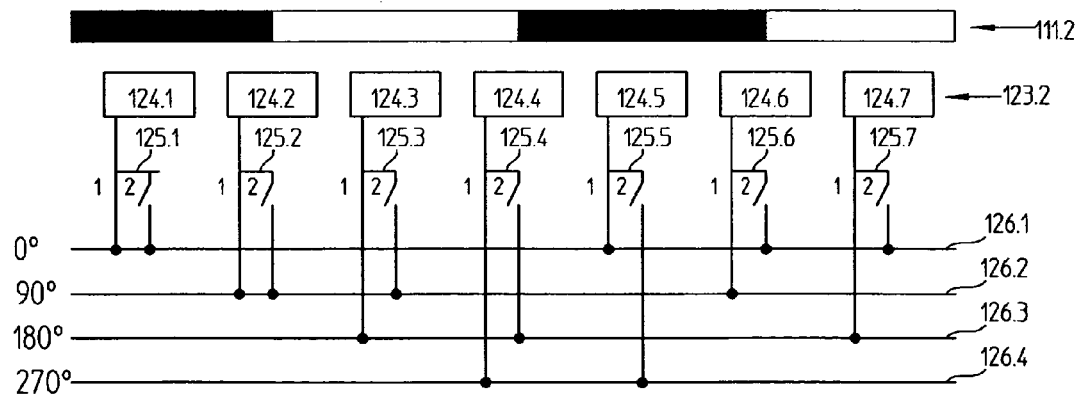
FIG. 4c illustrates the detector array illustrated in FIG. 4b adapted to a second rotary scale having a second radius.

FIG. 4a is a schematic partial view of a detector array 123 as described together with FIG. 2 as well as a plurality of switching elements 125.1 to 125.7 and four signal lines 126.1 to 126.4 for the four different scanning signals S0, S90, S180, S270 differing with respect to their phase relationship to the scanned scale structure. For clarity, the schematic representations in FIGS. 4a to 4c illustrate only one of the two partial photodiode arrays from FIGS. 3a, 3b. Numerals 124.1 to 124.7 designate the seven shown photodiodes of the detector array 123 which include a typical application of 120 single photodiodes. Each photodiode 124.1 to 124.7 is connected with a switching element 125.1 to 125.7. The switching elements 125.1 to 125.7 include two single switches 1, 2 which allow to connect the respective photodiode 124.1 to 124.7 with at least one of the four signal lines 126.1 to 126.4. Either switch 1 or switch 2 of the different switching elements 125.1 to 125.7 has to be activated if a scale with radius R1 or radius R2 should be scanned with the photodiode array. If more (e.g., N) different radii are scanned, more switches (e.g., N) may be necessary per switching element. Switching elements 125.1 to 125.7 and their switches 1, 2 may be activated in a defined manner by suitable control lines. The choice of the correct connection between a single photodiode 124.1 to 124.7 and the appropriate signal line 126.1 to 126.4 depends on the scale radii which may be scanned with the detector array 123.

To illustrate this in principle, FIGS. 4b and 4c illustrate two different manners in which the photodiodes 124.1 to 124.7 of the detector array 123 illustrated in FIG. 4a are connected with the signal lines 126.1 to 126.4 to generate the four phase-shifted scanning signals S0 to S270 at different scale radii R1, R2. Two differing configurations of the detector array 123_1, 123_2 result in these two exemplary cases. In addition, a part of the scanned scale structures 111.1 111.2 having transparent and opaque areas with different radii is also illustrated in FIGS. 4b and 4c.

Accordingly, the part of the detector array 123_1 as illustrated in FIG. 4b may be suitable to scan a first rotary scale having a first radius R1, the part of the detector array 123_2 as illustrated in FIG. 4c may be suitable to scan a second rotary scale having a second radius R2. For that purpose, the different photodiodes 124.1 to 124.7 have to be assigned at least to one of the four different signal phases 0°, 90°, 180°, 270° or signal lines 126.1 to 126.4 respectively.

Figure 5:
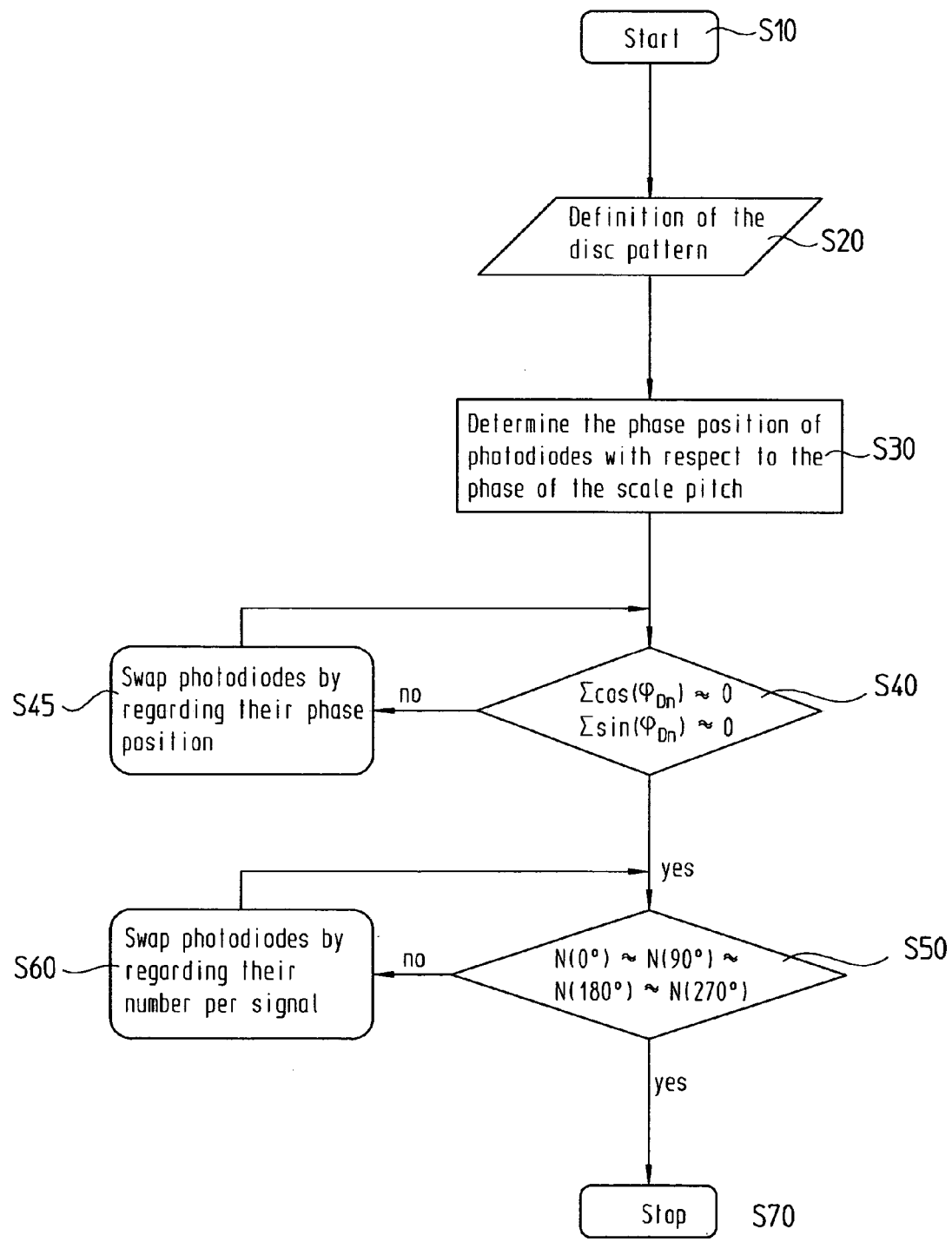
FIG. 5 illustrates a flowchart to explain an exemplary method in which a photodiode detector array may be optimized for a certain rotary scale radius.

The manner in which the different photodiodes 124.1 to 124.7 are assigned to the different signal phases 0°, 90°, 180°, 270° or signal lines 126.1 to 126.4 in both cases is explained in connection with. FIG. 5 below.

As illustrated in FIGS. 4b and 4c. in both cases result different distributions of the phase different photodiodes 124.1 to 124.7 because of the different chosen switching states. In FIG. 4b, signal phases 0°, 90°, 90°, 180°, 270°, 0°, 0° are assigned to the photodiodes 124.1 to 124.7 of the detector array optimized for scanning the radius R1. In contrast herewith, signal phases 0°, 90°, 180°, 270°, 0°, 90°, 180° are assigned to the photodiodes 124.1 to 124.7 of the detector array optimized for scanning the radius R2. Both array configurations may offer a suitable signal quality for generating the required four phase-different scanning signals S0 to S270.

Figure 6:
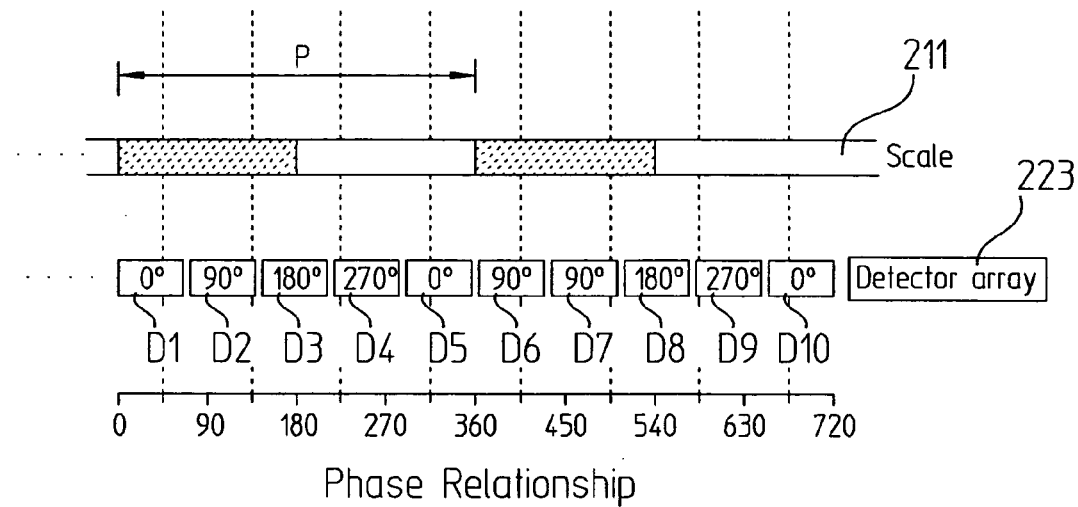
FIG. 6 illustrates a part of a scale on a code disc together with a part of a photodiode array.

In connection with the flowchart illustrated in FIG. 5 and the schematic illustration of FIG. 6, a method is described in which a given, suitable photodiode detector array for generating four quadrature incremental scanning signals may be optimized via suitable activation of the switching elements for one of at least two different scale radii in an optical rotary encoder.

After starting the optimization procedure in step S10, the disc pattern which may be used in the desired application as rotary scale has to be defined in step S20. This means that the radius R of the rotary scale on the code disc may have to be chosen. Furthermore, step S20 requires choosing the pitch P of the incremental rotary scale. The pitch P of the scanned incremental scale is defined as combined length of adjacently arranged opaque and transparent parts of the scale as illustrated in FIG. 6. Step S20 also requires defining the radial extension of the scale structure as well as defining the concrete geometry of the opaque and transparent parts of the scale.

Having chosen the geometrical data of the rotary scale, the next steps S30 to S70 are related to the optimization of the photodiode detector array and the appropriate positioning or respectively interconnecting of the photodiodes and/or parts thereof with the different switching elements.

In step S30, the phase position of the different photodiodes is determined in the detector array with respect to the rotary scale structure. In connection with this step as well as to the following steps, reference is also made to FIG. 6, which illustrates a part of the scale structure 211 together with a part of the photodiode detector array 223 with several photodiodes D1 to D10 of the detector array 223. Furthermore, the phase relationships between the photodiodes D1 to D10 and the scale 211 are schematically illustrated in FIG. 6.

Step S30 first requires to define the center phase values of the photodiodes which are used to generate the signals S0, S90, S180, S270 relative to the scale structure. In the example illustrated in FIG. 6, the center phase value of photodiode D1 generating the signal S0 is chosen to be assigned 40°, the center phase value of photodiode D2 generating the signal S90 is chosen to be assigned 115°, the center phase value of photodiode D3 generating the signal S180 is chosen to be assigned 180°, the center phase value of photodiode D4 generating the signal S270 is chosen to be assigned 250°.

In the next step S40 of the optimization procedure, it is checked whether the conditions expressed by equations (1 a), (1 b) are at least approximately fulfilled for the arrangement of the different photodiodes in the detector array:

$$\Sigma \cos(\phi_{Dn}) \approx 0 \qquad \text{Equ. (1a)}$$

$$\Sigma \sin(\phi_{Dn}) \approx 0 \qquad \text{Equ. (1b)}$$

in which Dn represents the phase relationship of photodiode Dn (n=1, 2, 3 . . . ) relative to the scale structure, $-180° < \phi_{Dn} \leq 180°$.

These conditions may be interpreted illustratively by the requirement that the average phase of each signal being generated by all phase-identical photodiodes shall be nearly identical to the center phase value.

If the conditions expressed via equations (1a) and (1b) are fulfilled at least approximately and the phase positions of the photodiodes are chosen appropriately the optimization method continues with step S50. Otherwise, the photodiodes are swapped regarding their phase position according to step S45 as long as equations (1a) and (1b) are at least approximately fulfilled. Swapping of photodiodes in the course of the optimization process may be achieved by activating different switching configurations.

In step S50, a further check is made with respect to the number of photodiodes per signal phase. In this connection, it is tried to equalize the number of photodiodes generating signals with different phase relationships. This requirement may be expressed by the following relationship (2):

$$N(0°) \approx N(90°) \approx N(180°) \approx N(270°) \qquad \text{Equ. (2)}$$

in which N(0°) represents the number of photodiodes generating 0° signals, N(90°) represents the number of photodiodes generating 90° signals, N(180°) represents the number of photodiodes generating 180° signals, and N(270°) represents the number of photodiodes generating 270° signals.

If the number of photodiodes for different signal phases is chosen according to this requirement, it may be ensured that all incremental scanning signals generated by the photodetector array have approximately identical signal amplitudes and signal offsets. This may be important in connection with further processing these signals, e.g., in subsequent interpolation electronics.

If relationship (2) is also fulfilled, the optimization procedure is finished at step S70. Otherwise, the different photodiodes are swapped according to step S60 as long as this condition is fulfilled at least approximately.

The appropriate swapping of the photodiodes in steps S45 and S60 is achieved in the detector array by selectively combining the different photodiodes via suitable switching elements. Due to the given hardware structure, it may be possible that the above-mentioned requirements in Equations (1a), (1b) and (2) may be fulfilled only approximately. Nevertheless, it is possible to use the same detector array for scanning scales with different scale radii and to achieve an adequate signal quality.

This optimization procedure may be executed for each of at least two different scale radii for the detector array. As result of this procedure, a suitable configuration of the detector array is available for the different scale radii.

With regard to the possible scale radii, it is possible to have the detector array optimized by a procedure as described above to at least two different finite radius values. However, it is also possible to use the same detector array in case where one of the two radius values is finite whereas another radius is infinite. This means that it is possible to use the same detector array hardware for rotary encoders as well as for linear encoders.

In the example of the detector array illustrated in FIG. 2, the problem of a certain phase mismatch at the outer areas of the array may be solved by splitting the array and providing at least two photodiode tracks in radial direction as already mentioned above. Another approach to deal with this is illustrated in FIG. 7.

Figure 7:
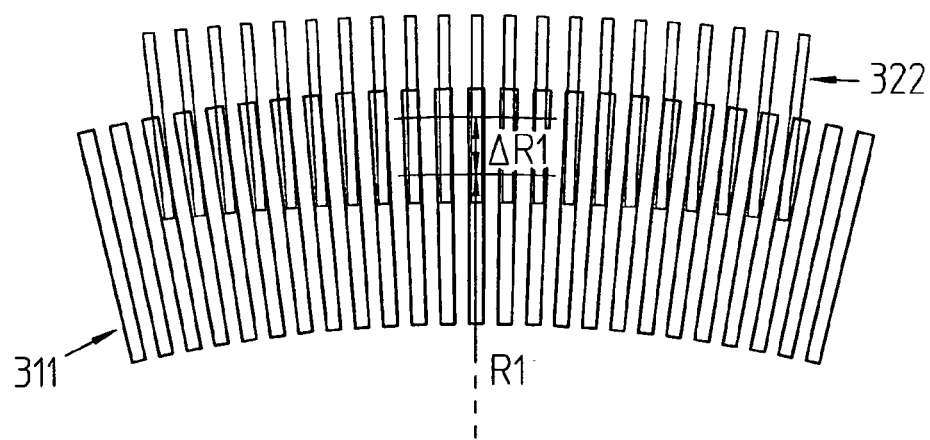
FIG. 7 schematically illustrates another possibility to correct the resulting mismatch of the photodiodes at the outer areas of the detector array.

FIG. 7 illustrates a part of a rotary scale 311 having a radius R1 which may be scanned with detector array 322. To ensure that also the outer photodiodes of detector array 322 generate scanning signals having the desired phase relationship with respect to the rotary scale 311, the array may be arranged in the scanning unit radially displaced by a certain displacement amount AR1. In this connection, AR1 describes the detector array displacement amount calculated from a relative position of the detector array 322 and the rotary scale 311 where there is complete overlap.

This measure may guarantee that the desired phase relationship of all photodiode output signals is at least approximately established over the complete array length in measuring direction x. The adapted detector array 322 may have to be arranged displaced radially by a displacement amount AR2 if the second rotary scale having radius R2 is scanned.

The principles described above may also be applied to the generation of reference signals by scanning appropriate index marks with a suitable detector array. This is schematically explained with reference to FIGS. 8 to 10.

Figure 8:
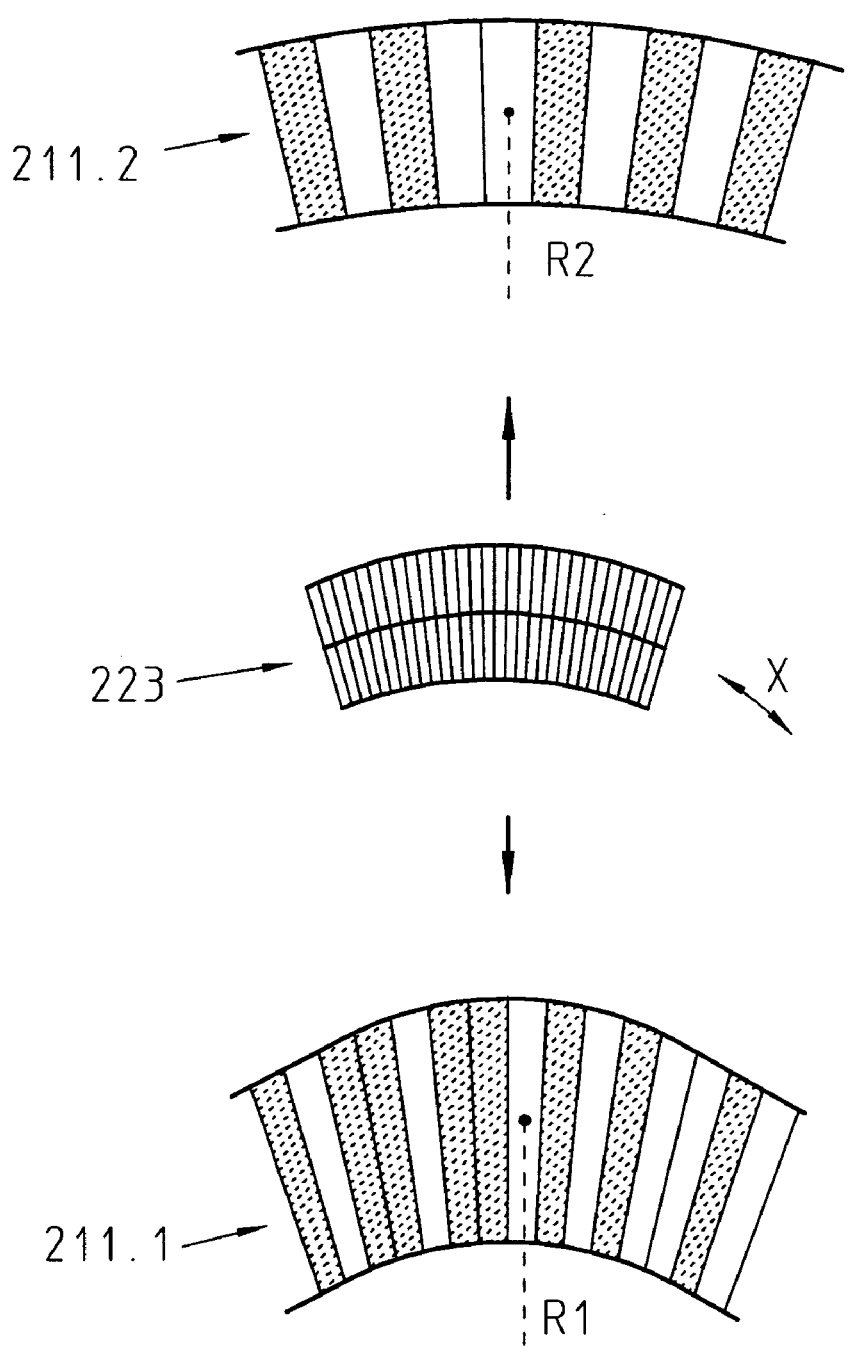
FIG. 8 schematically illustrates an example embodiment of a photodiode detector array together with two scale index marks for different rotary scale radii.

FIG. 8 schematically illustrates an example embodiment of a photodiode detector array together with two scale index marks for different rotary scale radii similar to the situation illustrated in FIG. 2 which describes the scanning of two incremental rotary scales having different radii. The tracks with the incremental rotary scales are omitted in FIG. 8.

The detector array 223 illustrated in FIG. 8 may be used to scan a first index mark 211.1 as well as a second index mark 211.2. First and second index marks 211.1, 211.2 may be arranged on code discs with different radii adjacent to the incremental rotary scale track in a conventional manner. The first index mark 211.1 may be used together with rotary scale 111.1 in FIG. 2, whereas the second index mark 211.2 may be used together with rotary scale 111.2 in FIG. 2. As illustrated in FIG. 8, both index marks are adapted and optimized for a certain radius R1 or R2.

The index marks 211.1, 211.2 include irregular distributions of areas on the code disc having different optical properties. In a transmitted light encoder as discussed above, the areas of the index mark are opaque and transparent.

Similar to the situation described above, the detector array 223 which is movable along the measurement direction x versus the index marks 211.1 or 211.2 may be used to scan index marks being adapted to different radii to generate one or more defined reference signals. This is possible due to the flexibility in switching different photodiodes of the array together with suitable switching elements and adapting it to a certain defined index mark geometry.

Figure 9A:
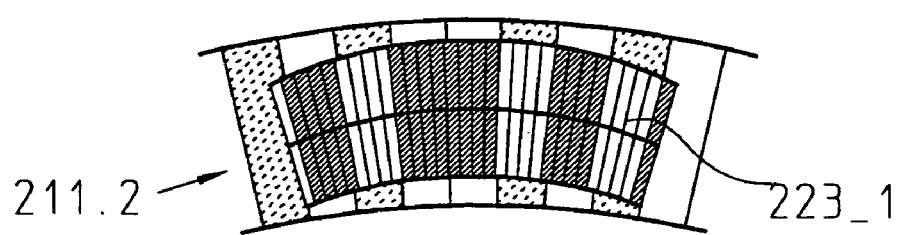
FIG. 9a schematically illustrates the application of the example embodiment of the photodiode detector array illustrated in FIG. 8 to a first index mark at a radius R1.
Figure 9B:
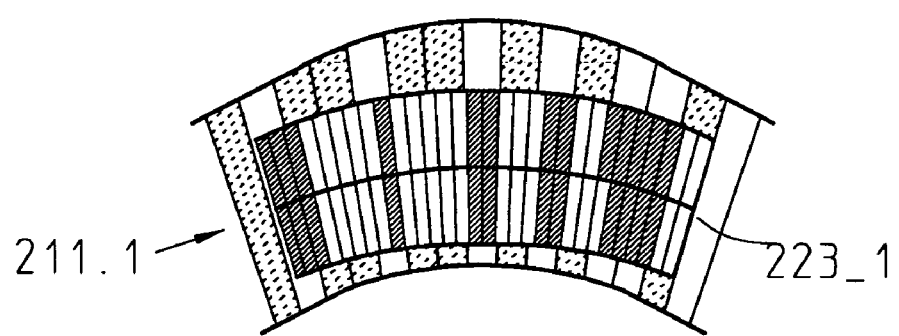
FIG. 9b schematically illustrates the application of the example embodiment of the photodiode detector array illustrated in FIG. 8 to a second index mark at a radius R2.

The appropriate switching states of the detector array 223_1, 223_2 together with the different index marks at different radii are schematically illustrated in FIGS. 9a and 9b. As illustrated, the manner in which the photodiodes are switched together is different for both radii and depends on the chosen index mark structures.

Accordingly, the foregoing may also be used in connection with scanning index marks at different radii. No additional design work with regard to the detector array hardware may be necessary if such an array is used together with index marks being optimized for different radii.

What is claimed is:

1. A detector array for optical encoders for providing position information of a scale movable with respect to the detector array, the detector array adapted to be used in connection with at least two scales having different radii, the detector array comprising:

a plurality of photodiodes, each photodiode configured to provide a scanning signal with a defined phase relationship to the scale when the detector array moves relative to the scale; and a plurality of switching elements configured to selectively combine each photodiode with other photodiodes in a defined manner;

wherein the switching elements are configured to allow the photodiodes to be unambiguously combined for at least two different scale radii to generate a defined number of phase shifted scanning signals, a combination of the photodiodes differing between the at least two different scale radii.

2. The detector array according to claim 1, wherein the plurality of photodiodes is arranged in at least two photodiode tracks, each track including a partial photodiode array with photodiodes extending in radial direction, the different photodiode tracks arranged concentrically with respect to each other.

3. The detector array according to claim 2, wherein photodiodes in different tracks are arranged to generate incremental scanning signals with identical phase relationships, the switching elements configured to connect the photodiodes in different tracks.

4. The detector array according to claim 2, wherein a plurality of adjacent photodiodes in each track are arranged to generate incremental scanning signals with identical phase relationships, the switching elements configured to connect the plurality of adjacent photodiodes.

5. The detector array according to claim 2, wherein the at least two photodiode tracks includes two tracks including partial photodiode arrays, each track including four groups of photodiodes configured to generate four incremental scanning signals with phase relationships 0°, 90°, 180° and 270°.

6. The detector array according to claim 5, wherein each group of photodiodes includes an identical number of photodiodes.

7. The detector array according to claim 2, wherein the partial photodiode arrays in the tracks include physically separated photodiodes in the tracks, the tracks shifted with respect to each other by a predefined circumferential shift amount.

8. The detector array according to claim 2, wherein the partial photodiode arrays in the tracks include physically separated photodiodes in the tracks, different phase relationships assigned to photodiodes extending along a common radial direction by corresponding switching configurations.

9. The detector array according to claim 1, wherein the different scale radii include a first finite radius and a second finite radius, the first finite radius different from the second finite radius.

10. The detector array according to claim 1, wherein the different scale radii include a first finite radius and a second infinite radius.

11. The detector array according to claim 1, wherein the detector array is displaced in a radial direction with respect to the scale by a radial displacement amount to establish a desired phase relationship of all photodiode output signals over a complete array length in a measuring direction.

12. A rotary encoder, comprising:
   a rotatable code disc including a circumferentially arranged rotary scale; and
   a photodiode detector array including:
      a plurality of photodiodes, each photodiode configured to provide a scanning signal with a defined phase relationship to the scale when the detector array moves relative to the rotary scale; and
      a plurality of switching elements configured to selectively combine each of the photodiodes with other photodiodes in a defined manner;
   wherein the switching elements are configured to allow the photodiodes to be unambiguously combined for at least two different rotary scale radii to generate a defined number of phase shifted scanning signals, a combination of the photodiodes differing between the at least two different rotary scale radii.

13. The rotary encoder according to claim 12, wherein the plurality of photodiodes are arranged in at least two different photodiode tracks, each track including a partial photodiode array with photodiodes of rectangular shape extending in radial direction, the different photodiode tracks arranged concentrically with respect to each other.

14. A detector array for optical rotary encoders for providing position information of a rotatable code disc with a circumferentially arranged rotary scale and at least one index mark, the detector array adapted to be used in connection with at least two rotary scales having different radii, the detector array comprising:
   a plurality of photodiodes, each photodiode configured to provide a reference signal when the detector array moves relative to the rotary scale; and
   a plurality of switching elements configured to selectively combine each of the photodiodes with other photodiodes in a defined manner;
   wherein the switching elements are configured to allow the photodiodes to be unambiguously combined for at least two different rotary scale radii to generate at least one defined reference signal, the combination of photodiodes differing between the at least two different scale radii.

15. The detector array according to claim 14, wherein each track includes two groups of photodiodes configured to generate two index scanning signals phase shifted by 180° with respect to each other.

* * * * *